(12) United States Patent
Fukui et al.

(10) Patent No.: US 9,346,370 B2
(45) Date of Patent: May 24, 2016

(54) ABNORMALITY DETECTING SYSTEM FOR AUTOMATED GUIDED VEHICLE

(71) Applicant: NISSAN MOTOR CO., LTD., Yokohama-shi, Kanagawa (JP)

(72) Inventors: Toshihito Fukui, Machida (JP); Mitsuru Hirayama, Isehara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/418,567

(22) PCT Filed: Jul. 31, 2013

(86) PCT No.: PCT/JP2013/070705
§ 371 (c)(1),
(2) Date: Jan. 30, 2015

(87) PCT Pub. No.: WO2014/021362
PCT Pub. Date: Feb. 6, 2014

(65) Prior Publication Data
US 2015/0175028 A1    Jun. 25, 2015

(30) Foreign Application Priority Data

Aug. 2, 2012 (JP) ................................ 2012-171714

(51) Int. Cl.
*H02J 7/00* (2006.01)
*B60L 11/18* (2006.01)
*B61B 13/00* (2006.01)
*G05B 23/02* (2006.01)

(52) U.S. Cl.
CPC ............ *B60L 11/1861* (2013.01); *B60L 11/18* (2013.01); *B61B 13/00* (2013.01); *G05B 23/0224* (2013.01)

(58) Field of Classification Search
USPC ............ 701/22; 320/104, 135, 127, 130, 134
See application file for complete search history.

(56) References Cited

U.S. PATENT DOCUMENTS

| | | | |
|---|---|---|---|
| 5,049,802 A * | 9/1991 | Mintus ................. | B60L 3/0069 320/107 |
| 2003/0042866 A1* | 3/2003 | Minamiura ........ | G01R 31/3658 320/104 |
| 2008/0183347 A1* | 7/2008 | Miki ................... | B60L 15/2045 701/22 |
| 2012/0032668 A1 | 2/2012 | Hayashi | |
| 2014/0172196 A1 | 6/2014 | Hayashi | |
| 2014/0375275 A1* | 12/2014 | Hung ..................... | B60L 3/003 320/139 |
| 2015/0175028 A1* | 6/2015 | Fukui ..................... | B61B 13/00 701/22 |

FOREIGN PATENT DOCUMENTS

| | | |
|---|---|---|
| CN | 102372006 A | 3/2012 |
| JP | 63-78205 A | 4/1988 |
| JP | 9-251318 A | 9/1997 |
| JP | 9-267614 A | 10/1997 |

(Continued)

*Primary Examiner* — Thomas Tarcza
*Assistant Examiner* — Richard Goldman
(74) *Attorney, Agent, or Firm* — Foley & Lardner LLP

(57) ABSTRACT

A system for detecting an abnormality of an automated guided vehicle that travels on a circulation route includes: a history recording unit for recording a change history of a current of a battery of the automated guided vehicle with respect to each circulation; and an abnormality determining unit for determining presence or absence of an abnormality of the automated guided vehicle on the basis of the change history of the current of the battery recorded for each circulation.

6 Claims, 8 Drawing Sheets

(56) References Cited

FOREIGN PATENT DOCUMENTS

| | | |
|---|---|---|
| JP | 2006-4012 A | 1/2006 |
| JP | 2007-68398 A | 3/2007 |
| JP | 2008-128686 A | 6/2008 |
| JP | 2012-63961 A | 3/2012 |
| JP | 2013-125350 A | 6/2013 |
| KR | 20080065901 A | 7/2008 |

* cited by examiner

ABNORMALITY DETECTING SYSTEM FOR AUTOMATED GUIDED VEHICLE

TECHNICAL FIELD

The present invention relates to a system to detect an abnormality of an automated guided vehicle.

BACKGROUND ART

JP2007-68398A discloses an automated guided vehicle that can charge a battery without requiring an exchange work of batteries.

SUMMARY OF THE INVENTION

There is a risk that a battery deteriorates when the battery becomes over discharged. Therefore, it is abnormally stopped (or is shut down) in advance without over-discharging. In a case where charging timing of an automated guided vehicle is delayed, the automated guided vehicle may abnormally stop (or is shut down). In a case where the automated guided vehicle abnormally stops on a traveling route, a working efficiency of a factory worker is reduced.

The present invention has been made by focusing on such a conventional problem. It is an object of the present invention to provide an abnormality detecting system for an automated guided vehicle, which can detect an abnormality of the automated guided vehicle in advance before the automated guided vehicle abnormally stops (or is shut down).

One aspect of the system for detecting an abnormality of an automated guided vehicle that travels on a circulation route according to the present invention includes: a history recording unit for recording a change history of a current of a battery of the automated guided vehicle with respect to each circulation, the change history indicating fluctuations of the battery current; and an abnormality determining unit for determining presence or absence of an abnormality of the automated guided vehicle on the basis of the change history of the current of the battery recorded for each circulation.

DETAILED DESCRIPTION OF THE EMBODIMENTS

Hereinafter, embodiments of the present invention will be described with reference to the accompanying drawings.

First Embodiment

Figure 1:
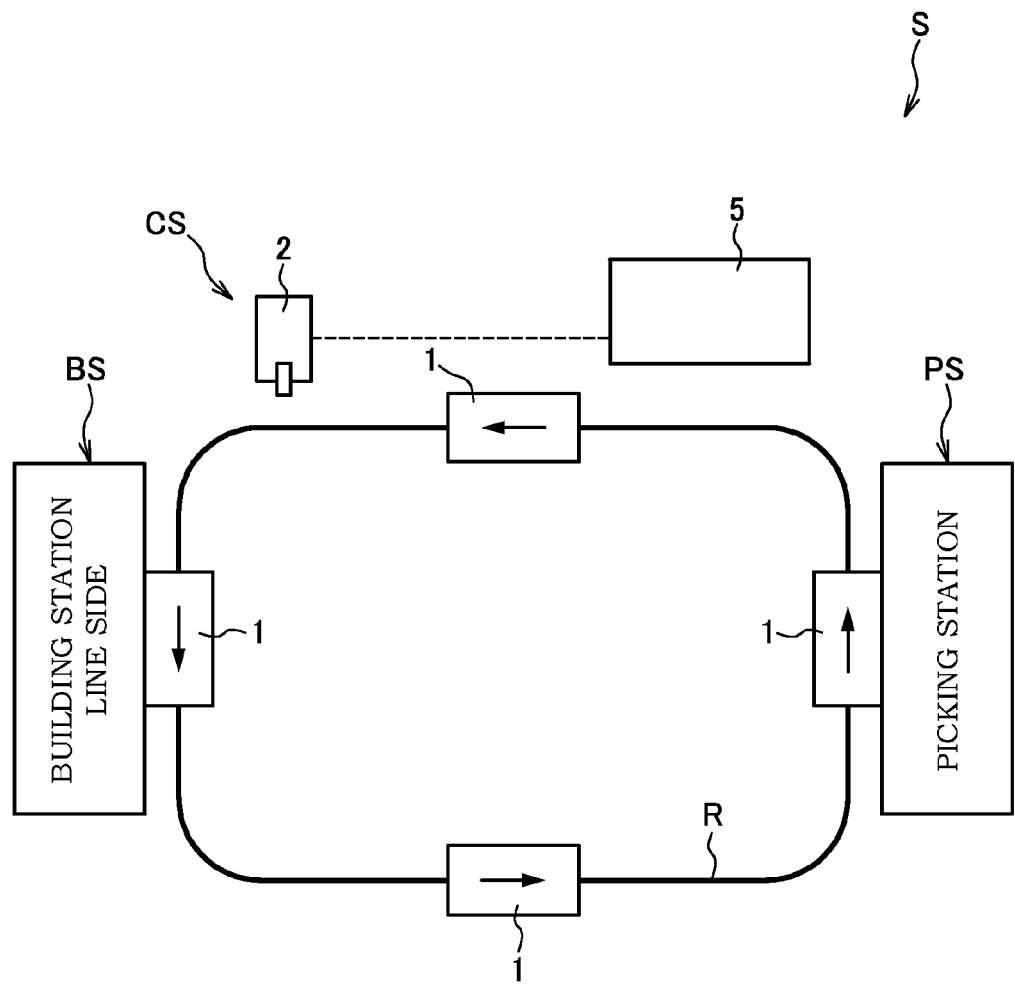
FIG. 1 is an overall view showing a first embodiment of an abnormality detecting system for an automated guided vehicle according to the present invention.

FIG. 1 is an overall view showing a first embodiment of an abnormality detecting system for an automated guided vehicle according to the present invention.

An abnormality detecting system S for an automated guided vehicle includes an automated guided vehicle (Automated Guided Vehicle; AGV) 1, a charging apparatus 2, and a control equipment 5.

The automated guided vehicle 1 travels in circle on a traveling route R to convey components. The traveling route R is an orbit that goes through a picking station PS, a building station BS, and a charging station CS. An operation of the automated guided vehicle 1 is controlled by a controller mounted thereon. The automated guided vehicle 1 is loaded with components at the picking station PS. The automated guided vehicle 1 then travels on the traveling route R to convey the components to the building station BS. Subsequently, the automated guided vehicle 1 unloads the components at the building station BS. Subsequently, the automated guided vehicle 1 travels on the traveling route R again to return to the picking station PS. Further, the automated guided vehicle 1 is charged at the charging station CS if necessary. In this regard, in FIG. 1, four automated guided vehicles 1 travel on the traveling route R, but it is not limited to this. There may be at least one automated guided vehicle, or may also be five or more automated guided vehicles. A specific component of the automated guided vehicle 1 will be descried later.

The charging apparatus 2 charges the automated guided vehicle 1. The charging apparatus 2 also transmits and receives signals to and from the automated guided vehicle 1 while charging. The charging apparatus 2 is installed in the charging station CS. The charging station CS is provided in front of the building station BS, for example, as shown in FIG. 1. The charging apparatus 2 is controlled by the control equipment 5.

The control equipment 5 controls the charging apparatus 2. The control equipment 5 also transmits and receives signals to and from the automated guided vehicle 1 via the charging apparatus 2.

Figure 2:
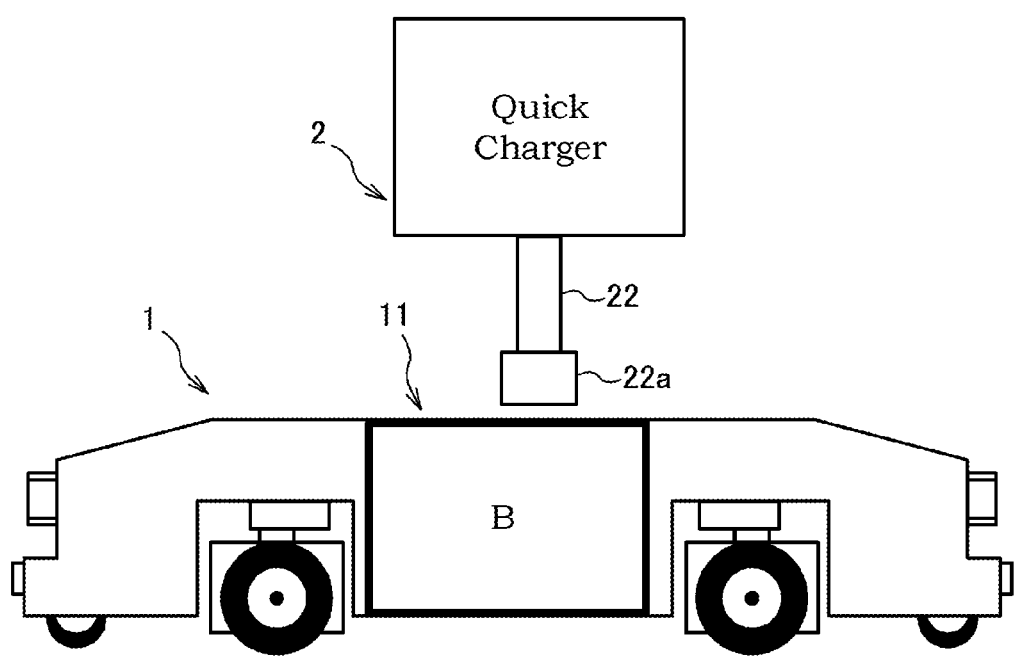
FIG. 2 is a view for explaining an outline of the automated guided vehicle and a charging work.

FIG. 2 is a view for explaining an outline of the automated guided vehicle and a charging work.

The automated guided vehicle 1 is equipped with a battery box 11 in the center of the vehicle, for example. The battery box 11 houses a battery B and the like. The automated guided vehicle 1 travels using the battery B as a driving power source. The battery B is charged by connecting a power feeding contactor 22a to the charging apparatus 2.

Figure 3:
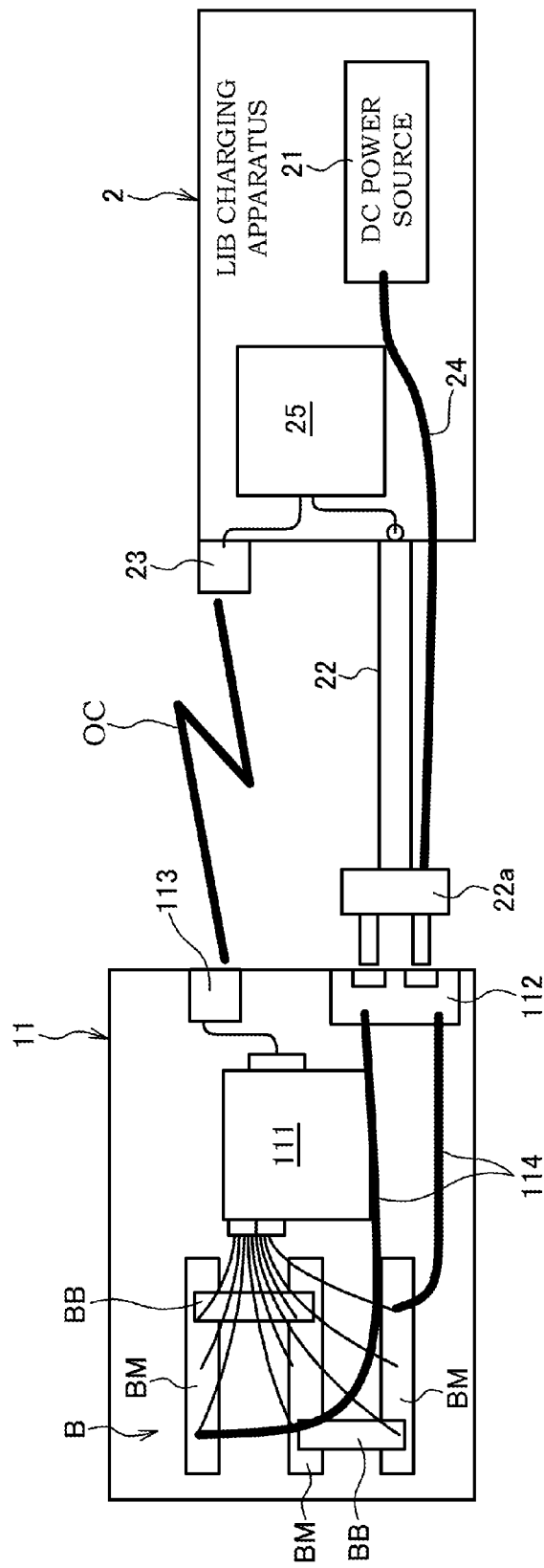
FIG. 3 is a view for explaining an outline of a battery box and the charging work.

FIG. 3 is a view for explaining an outline of the battery box and the charging work.

The battery box 11 houses the battery B, a charge/discharge monitor 111, a power input component 112, and a communication port 113.

The battery B is a lithium-ion secondary battery, for example. The battery B contains battery modules BM that are connected in series by means of bus bars BB. In FIG. 3, three battery modules BM are connected in series.

The battery module BM is configured by connecting a plurality of lithium-ion electric cells (cells) in parallel or in series. A voltage of this battery module BM is about a little over 8V at a charging state. Since the three battery modules BM are connected in series in the battery B, an output voltage of the battery B becomes about 25V.

The charge/discharge monitor 111 monitors a state of the battery B. The charge/discharge monitor 111 monitors and records a charge/discharge capacity (battery voltage) and a cell voltage of the battery B and each battery pack, the amount of current (ampere hour; Ah) of an input and output of the battery B, and the like every predetermined time (for example, 10 msec.). Information of the charge/discharge monitor 111 is outputted from the communication port 113 (for example, via optical communication). This information is transmitted from the communication port 113 to the control equipment 5 via the communication port 23 of the charging apparatus 2 as indicated by the bent line OC.

The power input component 112 is exposed toward an external surface of the battery box 11. The power input component 112 is connected to the battery B via feeding cables 114. The power feeding contactor 22a of the charging apparatus 2 is connected to the power input component 112. The battery B is charged at this state.

The charging apparatus 2 includes a DC power source 21, a power feeding arm 22, a communication port 23, and a control unit 25.

The DC power source 21 is a power source for charging the battery B. The DC power source 21 can boost to an upper limit voltage of the battery B.

The power feeding contactor 22a is provided at the tip of the power feeding arm 22. The power feeding contactor 22a is connected to the DC power source 21 via an electric wire 24. When the battery B of the automated guided vehicle 1 is charged, the power feeding arm 22 extends so as to connect the power feeding contactor 22a to the power input component 112. At this state, an electric power from the DC power source 21 is supplied to the battery B, whereby the battery B is charged.

The communication port 23 communicates, with the communication port 113 of the automated guided vehicle 1, a charge/discharge capacity (voltage) of the battery B, the amount of current (ampere hour; Ah) of the input and output of the battery B, other command signals, and the like.

The control unit 25 controls a current value and a voltage value supplied and applied to the battery B by means of the DC power source 21.

The automated guided vehicle 1 travels using the battery B as a driving power source. As the automated guided vehicle 1 travels, the charge/discharge capacity (voltage) of the battery B is reduced. Therefore, the automated guided vehicle 1 is properly charged at the charging station CS.

More specifically, the automated guided vehicle 1 temporarily stops at the charging station CS. Then, data on the charge/discharge capacity of the battery B of the automated guided vehicle 1 are transmitted to the charging apparatus 2 via the communication port 113 and the communication port 23. In a case where the charge/discharge capacity (voltage) of the battery B falls below a charge determining voltage, the battery B is charged by the charging apparatus 2.

In this regard, a constant-current and constant-voltage method is desirable in order to charge the battery B of the automated guided vehicle 1 at the charging station CS in the middle of a conveying step. Namely, a charging current with a constant current is supplied in the early stages of charging (constant current charge; CC charge). Then, when a battery voltage rises to a charging upper limit voltage, the charging voltage continues to be applied thereto for a predetermined time (constant-voltage charge; CV charge). By charging the battery B in such a method, boosting charge can be carried out.

In a case where the battery voltage rises to the charging upper limit voltage, the charging may be terminated, and the constant-voltage charge (CV charge) may be omitted. By doing it in this manner, it is possible to shorten the charging time further.

Further, the charging may be completed by charging the battery with a constant voltage for a preset time. By doing it in this manner, the battery voltage of the automated guided vehicle 1 rises by a charging time. Thus, the battery is suitably charged for a limited time.

Next, knowledge of the inventors will be explained in order to facilitate the understanding of the present embodiment.

Figure 4:
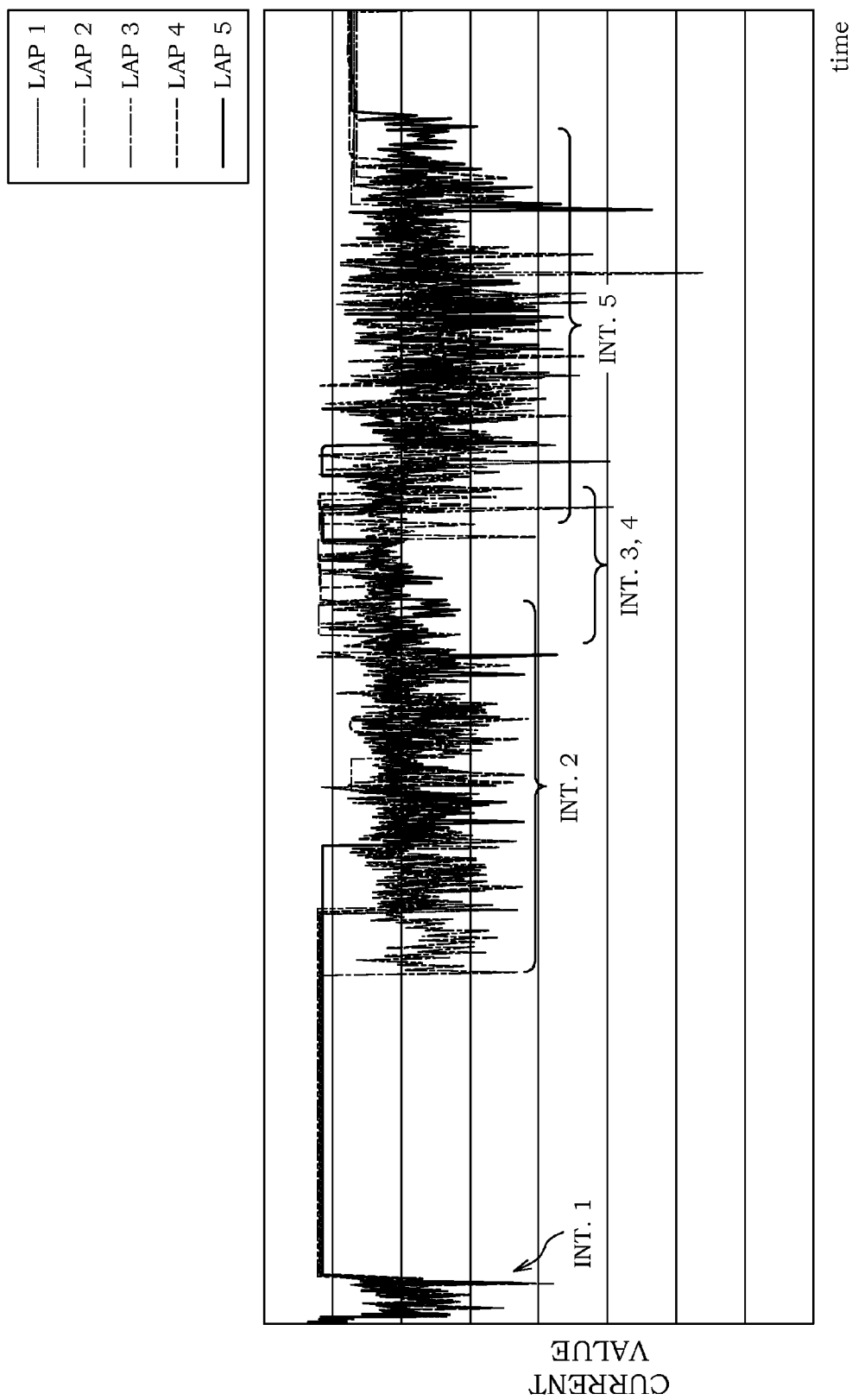
FIG. 4 is a view illustrating a change in a current when the automated guided vehicle circulates on a traveling route R.

FIG. 4 is a view illustrating a change in a current when the automated guided vehicle circulates on the traveling route R.

In this case, the traveling route R of the present embodiment is divided into five intervals.

An interval 1 is an interval when the automated guided vehicle stops and stands by for installation of components to the building station.

An interval 2 is an interval when the automated guided vehicle travels toward the picking station area.

Each of intervals 3, 4 is an interval when the automated guided vehicle delivers and receives the components at the building station or the picking station.

An interval 5 is an interval when the automated guided vehicle travels toward the building station after picking the components.

The current fluctuates depending upon the traveling interval. However, since the automated guided vehicle travels on a regular circulation route, a change history of the current becomes the same way.

Figure 5:
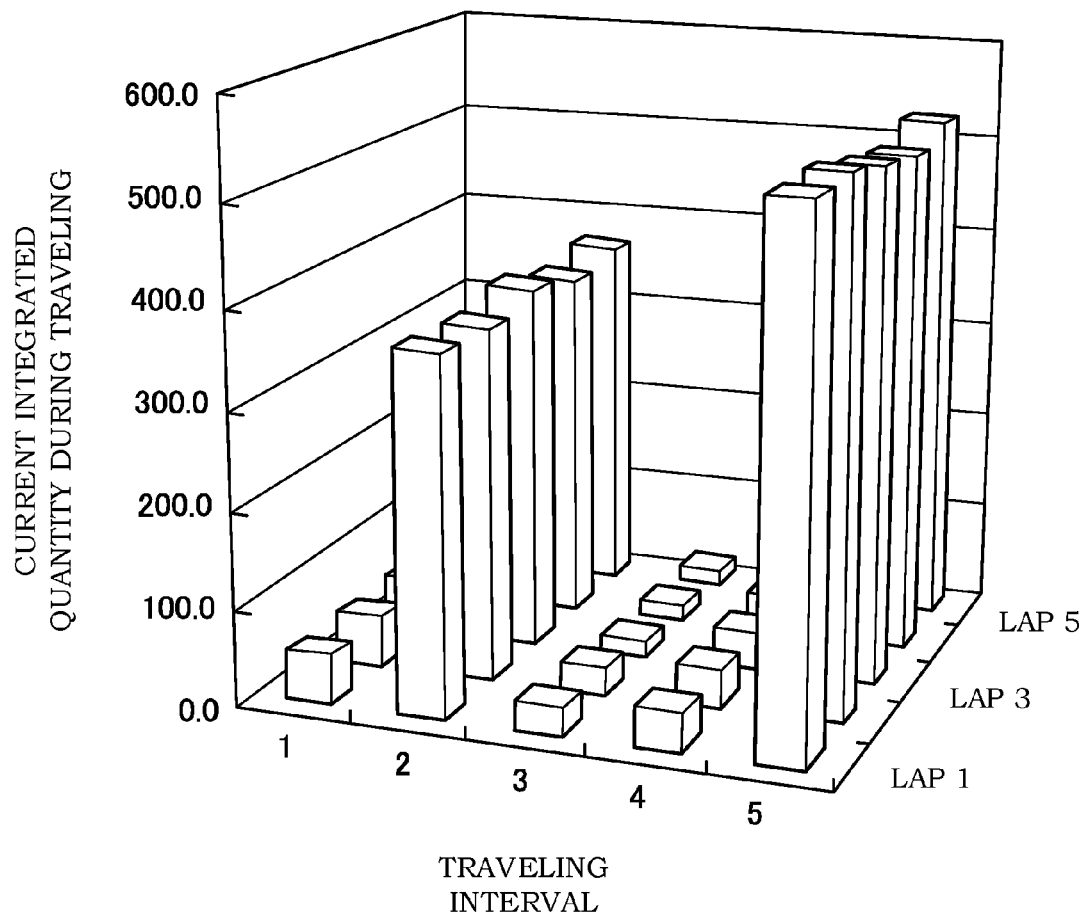
FIG. 5 is a view illustrating an integrated quantity (the amount of consumption) of a current that is outputted for every traveling lap number and every traveling interval by the battery of the automated guided vehicle.

FIG. 5 is a view illustrating an integrated quantity (the amount of consumption) of a current that is outputted for every traveling lap number and every traveling interval by the battery of the automated guided vehicle.

In the second interval and the fifth interval, the amount of consumption of the current becomes larger. In the first interval, the third interval and the fourth interval, the amount of consumption of the current becomes smaller. Thus, although there are various volumes in the amount of consumption of the current due to the traveling intervals, the automated guided vehicle travels on a regular circulation route. Therefore, the amount of consumption becomes the similar one in view of each interval.

The inventors focused on the fact that there is such a property in the amount of consumption of the current of the automated guided vehicle, and acquired knowledge that there are some abnormalities in an automated guided vehicle in a case where a change in a consumption pattern of the current becomes large, thereby achieving the invention. Hereinafter, the content of a specific control will be described.

Figure 6:
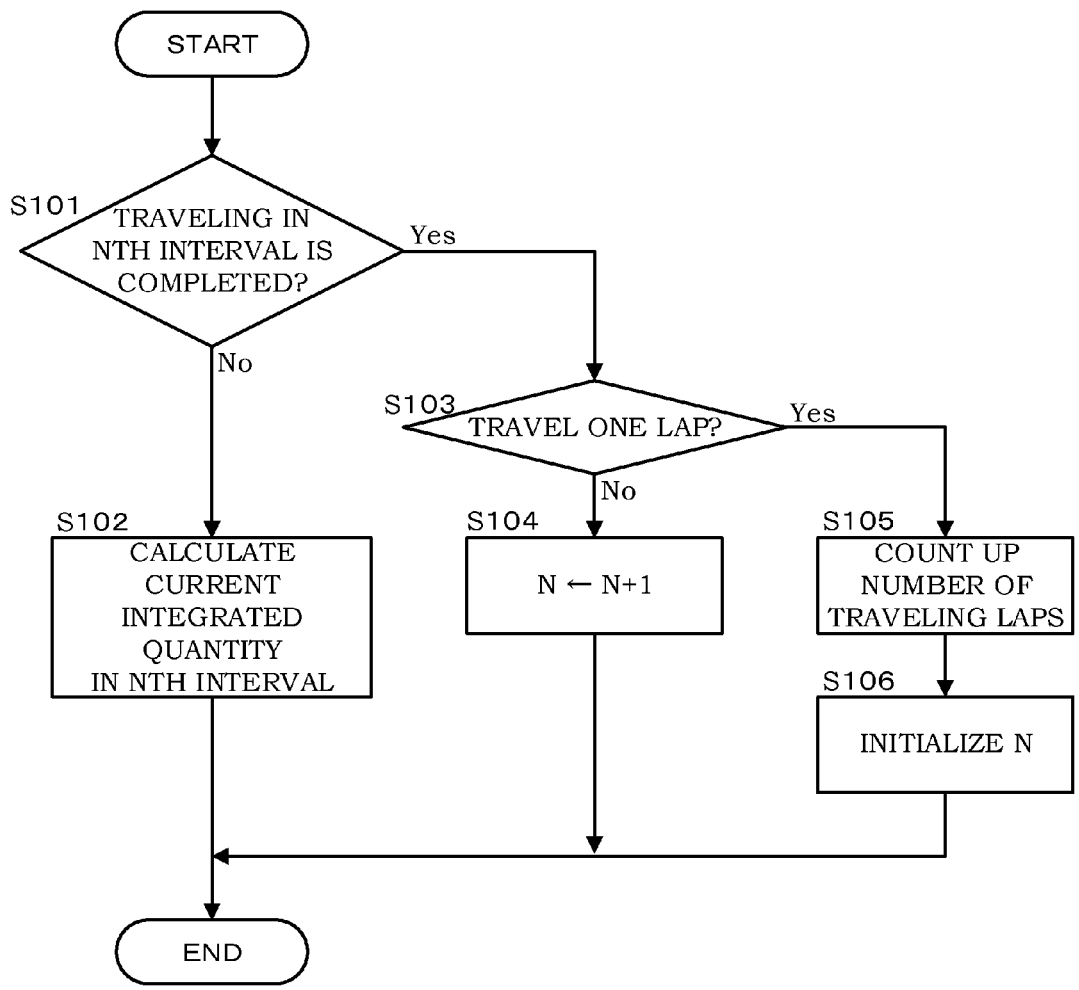
FIG. 6 is a control flowchart carried out by a controller of the automated guided vehicle.

FIG. 6 is a control flowchart carried out by the controller of the automated guided vehicle. This processing is repeatedly carried out for a minute time (for example, 10 msec.) cycle.

At Step S101, the controller determines whether traveling in an Nth interval is completed or not. In this case, an initial value of the "N" is one, and whether to travel in the Nth interval or not may be determined by reading command markers provided on the traveling route by means of a sensor, for example. The controller causes the processing to shift to Step S102 in a case where a determination result is negative. The controller causes the processing to shift to Step S103 in a case where the determination result is affirmative.

At Step S102, the controller calculates a current integrated quantity (the amount of consumption) in the Nth interval during a current traveling.

At Step S103, the controller determines whether the automated guided vehicle travels one lap or not. This may also be determined by reading the command markers provided on the traveling route by means of the sensor, for example. The controller causes the processing to shift to Step S104 in a case where a determination result is negative. The controller causes the processing to shift to Step S105 in a case where the determination result is affirmative.

At Step S104, the controller increments an interval number N.

At Step S105, the controller counts up the number of traveling laps.

At Step S106, the controller initializes the interval number N to one.

Figure 7:
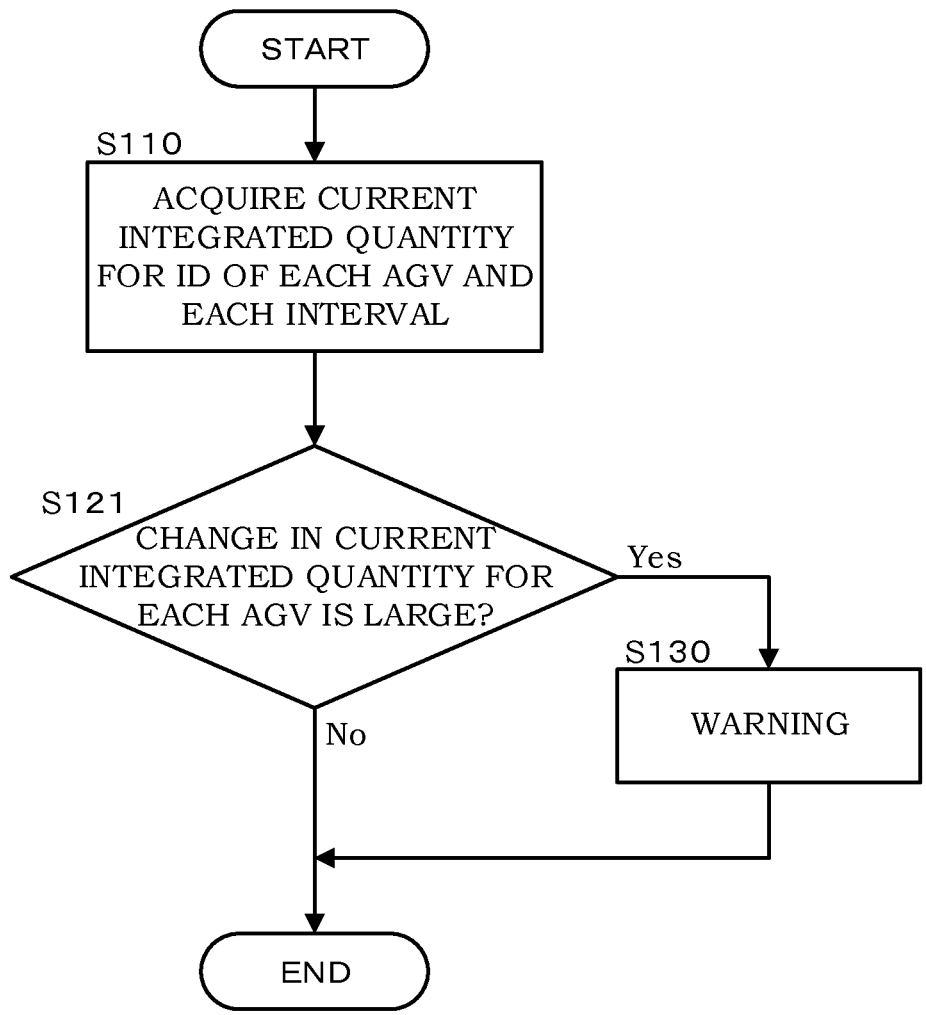
FIG. 7 is a control flowchart carried out by a controller of the control equipment 5.

FIG. 7 is a control flowchart carried out by a controller of the control equipment 5. This processing is repeatedly carried out for a minute time (for example, 10 msec.) cycle.

At Step S110, the controller acquires, via the charging apparatus 2, data of the current integrated quantity (the amount of consumption) for an ID of each of the automated guided vehicles 1 and each interval while charging each of the automated guided vehicles 1.

At Step S121, the controller determines whether a great change occurs in the current integrated quantity (the amount of consumption) in every traveling interval of each of the automated guided vehicles 1 or not. Namely, in a case where there is no abnormality in the automated guided vehicle, the current integrated quantity (the amount of consumption) for each traveling interval in each lap is almost the same as shown in FIG. 5. On the other hand, for example, in a case where the following condition (1) meets with respect to three intervals or more among five intervals or the following condition (2) meets with respect to two intervals or more among the five intervals, it is determined that a great change occurs.

(1) The current integrated quantity (the amount of consumption) in each interval of the circulation this time increases 1.5 (one and a half) times or more with respect to the current integrated quantity (the amount of consumption) in each interval of the circulation previous time.

(2) The current integrated quantity (the amount of consumption) in each interval of the circulation this time increases 2.0 (two) times or more with respect to the current integrated quantity (the amount of consumption) in each interval of the circulation previous time.

In this regard, the conditions (1) and (2) described above are merely one example. For example, in a case where the current integrated quantity not only increases but also decreases (for example, in a case where the quantity this time decreases 0.75 times or less with respect to the quantity previous time, or in a case where the quantity this time decreases 0.5 times or less with respect to the quantity previous time), it may also be determined that a great change occurs.

At Step S130, the controller informs the control equipment 5 of a warning. This warning may be displayed on a display of the control equipment 5, or a lamp may be lighted.

According to the present embodiment, an abnormality of the automated guided vehicle is detected on the basis of a change in a consumption pattern of the current of the automated guided vehicle. Here, the "abnormality" means a state that the amount of consumption of the battery changes significantly whenever the automated guided vehicle circulates on the traveling route, and is caused by a rapid wear of a tire, heat deterioration of the battery, and the like. In a case where such an abnormality cannot be detected, abnormal stop (shutdown) of the automated guided vehicle may occur. However, according to the present embodiment, it is possible to determine an abnormality in advance before it is led into such a situation. Further, since a warning is given when the abnormality is determined, it is possible to prevent the automated guided vehicle from abnormally stopping (or shutting down). Further, according to the present embodiment, it is determined whether a great change in the current integrated quantity (the amount of consumption) occurs in each traveling interval of each automated guided vehicle 1 or not. A wear degree of the tire and/or a deterioration degree of the battery are different from each other in the respective automated guided vehicle. Namely, there is an individual difference. Even in such a case, according to the present embodiment, since it is determined on the basis of the current integrated quantity (the amount of consumption) of each automated guided vehicle, it is possible to carry out abnormality determination accurately.

Further, the conditions (1) and (2) described above are merely one example. For example, the current integrated quantity may be compared with an average current integrated quantity (the average amount of consumption) in each interval of the circulations until the previous time. By doing it in this manner, it is also possible to detect an abnormality of the case where the current integrated quantity (the amount of consumption) continues to increase or decrease gradually.

Second Embodiment

Figure 8:
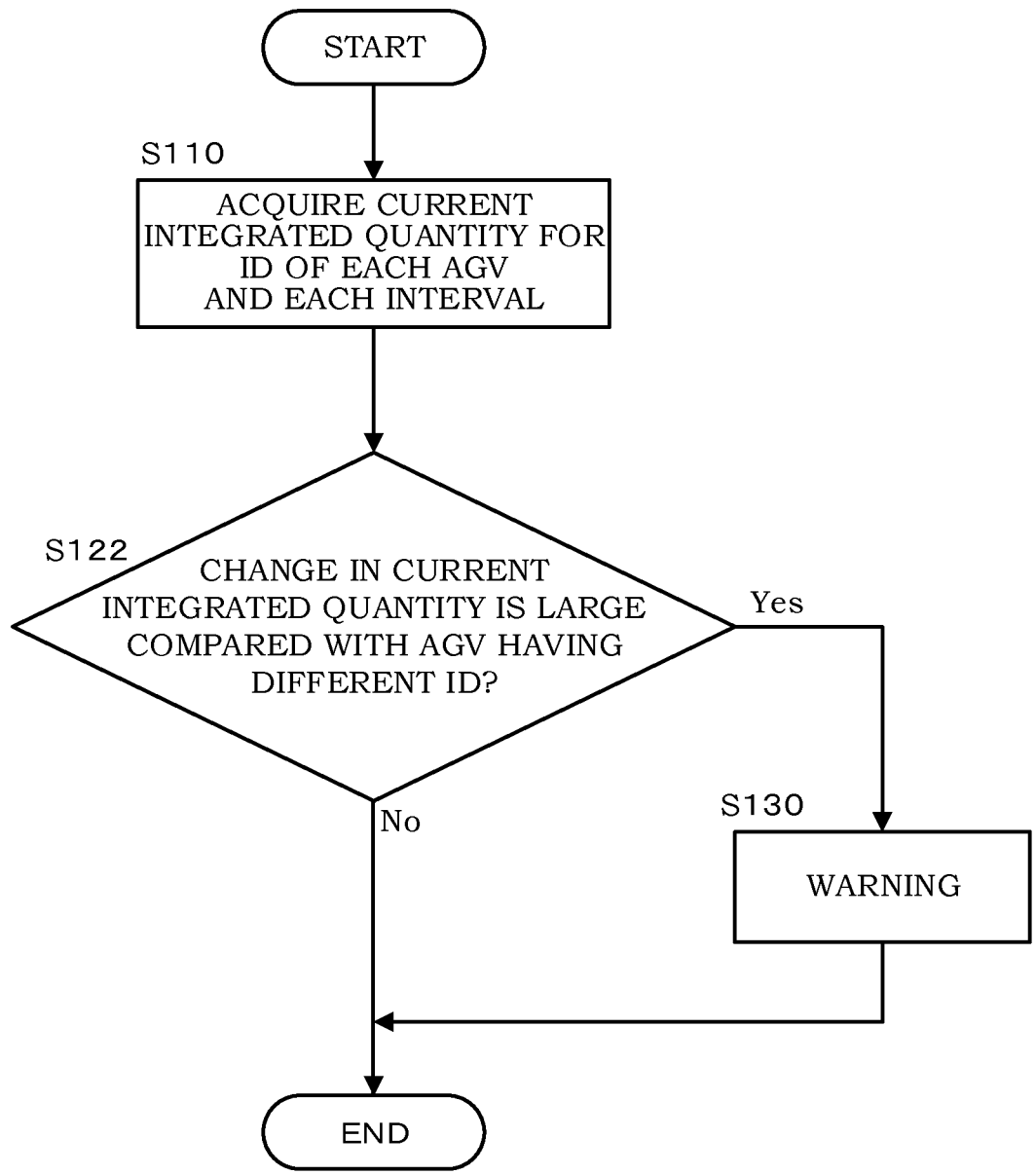
FIG. 8 is a control flowchart carried out by the controller of the control equipment 5 according to the second embodiment.

FIG. 8 is a control flowchart carried out by the controller of the control equipment 5 according to a second embodiment. This processing is repeatedly carried out for a minute time (for example, 10 msec.) cycle.

In this regard, the same reference numeral is applied to a portion that performs the similar function as that described above hereinafter, and repeated explanation is omitted appropriately.

At Step S122, the controller determines whether a great change in the current integrated quantity (the amount of consumption) in each traveling interval of each automated guided vehicle 1, which is a target of abnormality determination, occurs by being compared with the current integrated quantity (the amount of consumption) in each traveling interval of each automated guided vehicle 1 having a different ID. As for the automated guided vehicle having the different ID, for example, there is an automated guided vehicle that travels on the circulation route in front thereof. Further, the current integrated quantity (the amount of consumption) may be compared with an average value of the current integrated quantity (the amount of consumption) of the automated guided vehicle having the different ID. Then, as well as the first embodiment, it is determined that a great change occurs in a case where there are three intervals or more, in which the current integrated quantity increases 1.5 times or more, among the five intervals, or in a case where there are two intervals or more, in which the current integrated quantity increases 2.0 times or more, among the five intervals.

Further, it may be determined that a great change occurs in a case where the current integrated quantity (the amount of consumption) not only increases like the first embodiment, but also decreases.

In this regard, since Step S110 and Step S130 are similar to those in the first embodiment, detailed explanation thereof is omitted.

According to the present embodiment, an abnormality of a specific automated guided vehicle is detected when there is a great change in the consumption pattern of the current of a specific automated guided vehicle by being compared with the consumption pattern of the current of other automated guided vehicle. Since it is done in this manner, it is possible to accurately determine an abnormality due to performance deterioration of the specific automated guided vehicle.

Further, by detecting an abnormality of a specific automated guided vehicle when there is a great change in a consumption pattern of a current of the automated guided vehicle by being compared with an average consumption pattern of the current of other group of automated guided vehicles, it is possible to accurately determine an abnormality due to performance deterioration of the specific automated guided vehicle further.

As described above, the system (S) for detecting an abnormality of an automated guided vehicle (1) that travels on a circulation route includes: a history recording unit for recording a change history of a current of a battery of the automated guided vehicle (1) with respect to each circulation (Step S102); and an abnormality determining unit for determining presence or absence of an abnormality of the automated guided vehicle (1) on the basis of the change history of the current of the battery recorded for each circulation (Steps S121, 122). In a case where an abnormality cannot be detected, abnormal stop (shutdown) of the automated guided vehicle may occur. However, in the embodiments described above, it is possible to determine an abnormality in advance before it is led into such a situation. Further, it is determined whether a great change occurs in the current integrated quantity (the amount of consumption) recorded for every circulation of each automated guided vehicle or not. Each automated guided vehicle has a different wear degree of a tire and a different deterioration degree of a battery. Namely, there is an individual difference. Even in this case, since it is determined on the basis of the current integrated quantity (the amount of consumption) of each automated guided vehicle, it is possible to carry out the abnormality determination accurately.

As described above, although the embodiments of the present invention have been explained, the above embodiments merely illustrate a part of examples of application of the present invention, and it does not mean that a technical scope of the present invention is limited to a specific configuration of each of the embodiments described above.

For example, a specific determining condition of whether a great change occurs or not is just one example, and it may be determined appropriately.

Further, the embodiments described above can appropriately be combined with each other. Namely, both Step S121 in the first embodiment and Step S122 in the second embodiment are incorporated into one flowchart to be determined. Even though any one is established, the warning may be given at Step S130.

In this regard, the embodiments described above can appropriately be combined with each other.

The present application claims priority based on Japanese Patent Application No. 2012-171714, filed with the Japan Patent Office on Aug. 2, 2012, the entire content of which is expressly incorporated herein by reference.

The invention claimed is:

1. An abnormality detecting system for an automated guided vehicle, the system detecting an abnormality of the automated guided vehicle that travels on a circulation route, the abnormality detecting system comprising:
   a history recording unit for recording a change history of a current of a battery of the automated guided vehicle with respect to each circulation, the change history indicating fluctuations of the battery current; and
   an abnormality determining unit for determining a presence or absence of an abnormality of the automated guided vehicle on the basis of the change history of the current of the battery recorded for each circulation of the automated guided vehicle on the circulation route.

2. The abnormality detecting system for an automated guided vehicle according to claim 1,
   wherein the abnormality determining unit determines a presence or absence of an abnormality of the automated guided vehicle by comparing the change history in a most recent circulation of the automated guided vehicle with the change history in a preceding circulation before the most recent circulation.

3. The abnormality detecting system for an automated guided vehicle according to claim 1,
   wherein the abnormality determining unit determines a presence or absence of an abnormality of the automated guided vehicle by comparing the change history in a most recent circulation of the automated guided vehicle with an average change history of preceding circulations excluding the most recent circulation.

4. The abnormality detecting system for an automated guided vehicle according to claim 1,
   wherein there are multiple automated guided vehicles, and
   wherein the abnormality determining unit determines a presence or absence of an abnormality of one automated guided vehicle that completes a most recent circulation by comparing the change history of the one automated guided vehicle with a change history of another automated guided vehicle.

5. The abnormality detecting system for an automated guided vehicle according to claim 1,
   wherein there are multiple automated guided vehicles, and
   wherein the abnormality determining unit determines a presence or absence of an abnormality of one automated guided vehicle that completes a most recent circulation by comparing the change history of the one automated guided vehicle with an average change history of an other group of automated guided vehicles.

6. The abnormality detecting system for an automated guided vehicle according to claim 1,
   wherein the change history of the current of the battery is a history of a change in a current integrated quantity in a traveling interval of each circulation of the automated guided vehicle.

* * * * *